Sept. 9, 1969 J. Y. ROY ET AL 3,466,548
METHOD AND APPARATUS FOR REGENERATED VESTIGIAL SIDEBAND RECEPTION
Filed Oct. 3, 1966 4 Sheets-Sheet 1

INVENTORS.
JOSEPH Y. ROY,
JOHN K. MACDONALD,
By Charlton M. Lewis

INVENTORS.
JOSEPH V. ROY,
JOHN K. MACDONALD,
By Charlton M. Lewis

Sept. 9, 1969 J. Y. ROY ET AL 3,466,548

METHOD AND APPARATUS FOR REGENERATED VESTIGIAL SIDEBAND RECEPTION

Filed Oct. 3, 1966 4 Sheets-Sheet 3

INVENTORS.
JOSEPH Y. ROY,
JOHN K. MACDONALD,
By [signature]

INVENTORS.
JOSEPH Y. ROY,
JOHN K. MACDONALD,
By Charlton M. Lewis

United States Patent Office 3,466,548
Patented Sept. 9, 1969

3,466,548

METHOD AND APPARATUS FOR REGENERATED VESTIGIAL SIDEBAND RECEPTION

Joseph Yvon Roy, Laval des Rapides, Quebec, and John Kenneth MacDonald, Rosmere, Quebec, Canada, assignors to Conrac Corporation, a corporation of New York Filed Oct. 3, 1966, Ser. No. 583,818
Int. Cl. H04b 1/68
U.S. Cl. 325—331 26 Claims

ABSTRACT OF THE DISCLOSURE

Phase and quadrature distortions in the demodulation of vestigial sideband transmissions are eliminated by recreating the suppressed sideband on a new, harmonically unrelated carrier frequency, translating the non-suppressed sideband to precisely that new frequency, adding the complementary sidebands and presenting the resulting double sideband signal to the detector. The complementary sideband signals are typically produced by mixing the vestigial sideband signal with respective injection signals having frequencies such that one injection frequency equals the difference between the other injection frequency and the carrier frequency $f$ of the vestigial sideband signal. The injection frequencies may be derived as $m/p$ and $n/p$ times $f$, where $m$, $n$ and $p$ are integers such that $n$ equals the difference between $m$ and $2p$. Improved linearity of the phase vs. frequency characteristics of the double sideband signal is obtained by introducing a suitable phase difference between the two injection signals. Incidental phase modulation in the extraction of the carrier frequency from the vestigial sideband transmission is minimized by performing such extraction prior to shaping the signal to conventional spectral distribution, and after translation to a frequency only slightly greater than the line repetition frequency.

This invention relates to methods and apparatus for the reception and demodulation of vestigial sideband transmission of television signals and the like with virtual elimination of the two major forms of distortion normally present in such transmission, viz: phase distortion and quadrature distortion.

Envelope demodulation of a vestigial sideband wave produces distortion of the envelope due to the phase-frequency response of the receiver and to the presence of a quadrature component. The distortions so produced are called phase and quadrature distortions. Correction networks have been used to provide a portion of the required phase correction, and quadrature distortion has been reduced by limiting the degree of modulation. However, such procedures are incapable of providing fully satisfactory freedom from distortion under all conditions of practical operation.

The present invention substantially eliminates phase and quadrature distortions in television receivers by recreating the suppressed sideband of the transmission from the non-suppressed sideband and presenting a double sideband signal produced therefrom to the detector.

Two different injection frequencies are provided at the receiver having a predetermined relation to the carrier frequency of the vestigial sideband signal. The vestigial sideband signal is then combined with the respective injection frequencies to produce two distinct complementary sideband signals having a common carrier frequency that is different from the initial carrier frequency and preferably different from all other frequencies of the system. Those complementary signals are added to provide a double sideband signal for presentation to a detector.

In accordance with one aspect of the invention, the two injection frequencies are equal to the initial carrier frequency multiplied by respective fractions having the same integral denominator and different integral numerators, the three integers being preferably harmonically unrelated. That method of deriving the injection frequencies has the advantage that an independent locally generated frequency is not required, and that all the frequencies used may be harmonically unrelated, reducing the possibility of harmonic interference between sections of the system.

A further aspect of the invention provides injection frequencies that are related unsymmetrically to the initial carrier frequency, with the difference between the two injection frequencies equal to twice the carrier frequency. That relationship can be employed with a wide variety of techniques for deriving the injection frequencies, and produces a double sideband signal on a carrier frequency higher than that of the initial carrier.

Another aspect of the invention employs a locally generated auxiliary frequency and derives the two injection frequencies by combining that auxiliary frequency with the initial carrier frequency in such a way that the carrier frequency of the resulting double sideband signal is different from, and preferably harmonically unrelated to, both the initial carrier frequency and the auxiliary frequency. The latter relation reduces any tendency toward harmonic interference among the various frequencies present in the circuits.

Another aspect of the invention relates to the reduction of phase distortion that might result with a linear detector, due to lack of linearity of the phase vs. frequency relationship for each of the complementary sideband signals that are combined to produce a double sideband signal. We have discovered that such phase distortion can be reduced by suitably adjusting the relative phase of the two signals to be combined, and that minimum distortion ordinarily is obtainable at a phase relation other than equality. A particular advantage of the overall procedures provided by the present invention is that they permit convenient and effective adjustment of the phase relationship between the two complementary sideband signals to be combined.

A further aspect of the invention provides methods for extracting the carrier frequency of the initial vestigial sideband signal which substantially avoid the incidental phase modulation that is ordinarily produced by more direct methods of carrier extraction.

A system for demodulating vestigial sideband signals with recreation of the suppressed sideband has been described in Patent 2,987,617, issued on June 6, 1961 to Bernard D. Loughlin. However, Loughlin's system is subject to the severe disadvantage that the signal representing the suppressed sideband is developed on a carrier frequency that is the second harmonic of the initial carrier frequency. That harmonic relationship between two important carrier frequencies within the system results in a tendency to harmonic interference between the respective signals. Moreover, in Loughlin's system the carrier frequency of the initial vestigial sideband signal is directly equal to that of the resulting double sideband signal that is presented to the detector, further complicating the interference problem.

An important object of the present invention is to substantially eliminate such harmonic interference by providing a vestigial sideband receiver that recreates the suppressed sideband without requiring the use of harmonically related frequencies.

Patent 2,583,573, issued Jan. 29, 1952 to Edwin T. Jaynes, is concerned with receiving a radar signal that is somewhat analogous to a single sideband transmission.

Jaynes develops the missing sideband with the help of a locally generated frequency, directly producing a double sideband signal on a carrier frequency equal to that of the locally generated signal. Since Jaynes' receiver is immediately adjacent his transmitter, the carrier frequency is directly available at the receiver, and the problem of effectively extracting the carrier frequency from the transmitted signal does not arise. Also, the circuitry disclosed by Jaynes is such that he has no control over the relative phase of his two complementary signals.

The invention will now be described as it is represented in certain illustrative embodiments and with reference to accompanying drawings in which.

I.—MATHEMATICAL ANALYSIS OF VESTIGIAL SIDEBAND AND REGENERATED VESTIGIAL SIDEBAND RECEIVERS

(A) Vestigial sideband

Figures 1, 2, 3, 4:
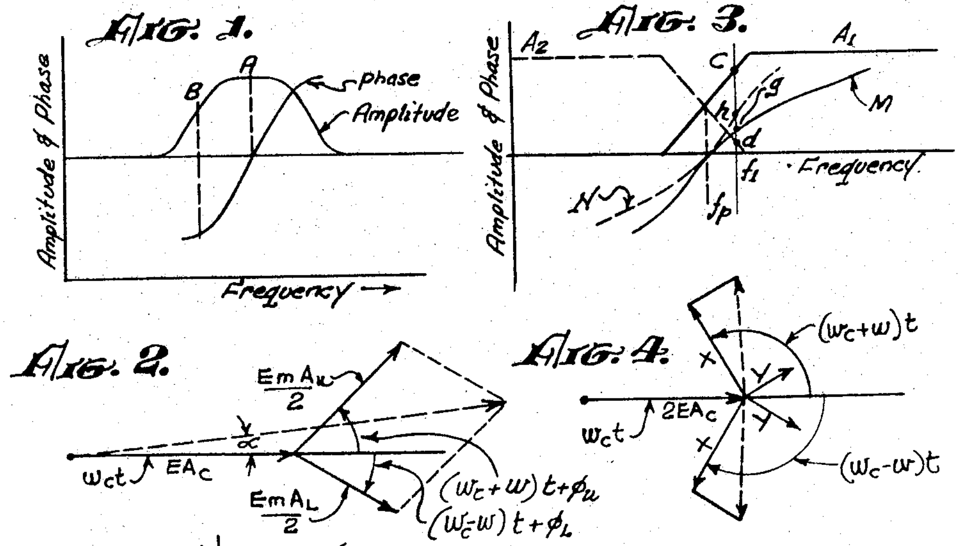
FIG. 1 represents graphically a typical band pass filter characteristic.
FIG. 2 is a vector representation of a vestigial sideband signal.
FIG. 3 represents graphically the addition of two complementary vestigial sideband signals.
FIG. 4 is a vector representation of the addition of the two sideband signals.

A vestigial sideband characteristic is produced by passing a double sideband wave through a filter which alters the relative amplitude of the respective sidebands. Such a filter also alters the phase. Referring to FIG. 1, there are shown typical amplitude and phase characteristics of a band pass filter.

In the double sideband case, i.e., with carrier frequency at point A, the transmitted sidebands at any modulating frequency will be of equal amplitude and since the phase characteristic is skew symmetrical about A the resultant of the two sidebands will always be in phase with the carrier.

Considering then the vestigial sideband case with carrier frequency at point B, for example, it is evident that the upper and lower sidebands are no longer equal in amplitude and since the phase is not skew symmetrical about B the resultant of the two sidebands will no longer be in phase with the carrier.

The following is a mathematical expression of the above conditions. Consider a carrier $f_c=\omega_c/2\pi$ modulated by a single signal frequency $f=\omega/2\pi$ in a double sideband system.

$$V_m=E(1+m\cos\omega t)\cos\omega_c t$$
$$=E\cos\omega_c t+\frac{mE}{2}\cos(\omega_c+\omega)t+\frac{mE}{2}\cos(\omega_c-\omega)t \quad (1)$$

where $m$ is the modulation index.

A vestigial sideband system modifies the signal so that in the general case (1) becomes $$V_v=E\left[A_c\cos\omega_c t+\frac{mA_u}{2}\cos\{(\omega_c+\omega)t+\phi_u\}+\frac{mA_L}{2}\cos\{(\omega_c-\omega)t+\phi_L\}\right] \quad (2)$$

where $A_c$, $A_u$, $A_L$ are amplitude factors and $\phi_u$, $\phi_L$ are phase factors, the subscripts $c$, $u$, L referring to carrier, upper and lower sidebands, respectively.

For ease of calculation the carrier phase has been taken as the reference. That is: $\phi_u=\phi_u'-\phi_c$ where $\phi_u'$ is the absolute value of the upper sideband phase and $\phi_c$ is the carrier phase, and similarly $\phi_L=\phi_L'-\phi_c$. This means in effect that the phase curve of FIG. 1 has been moved upwards in the particular example shown to bring the phase characteristic to zero at $f_c$.

A vector representation of Equation 2 is shown in FIG. 2.

The envelope amplitude may be represented as follows:

$$V_e=E\left[A_c^2+\frac{m^2}{4}\{A_u^2+A_L^2+2A_uA_L\cos(2\omega t+\phi_u-\phi_L)\}+mA_c\{A_u\cos(\omega t+\phi_u)+A_L\cos(\omega t-\phi_L)\}\right]^{1/2} \quad (3)$$

The ratio of the quadrature component to the in-phase component is $$\tan\alpha=\frac{\frac{mA_u}{2}\sin(\omega t+\phi_u)-\frac{mA_L}{2}\sin(\omega t-\phi_L)}{A_c+\frac{mA_u}{2}\cos(\omega t+\phi_u)+\frac{mA_L}{2}\cos(\omega t-\phi_L)} \quad (4)$$

For small values of m such that the terms in $m^2$ and higher may be neglected, the overall video amplitude characteristic is given by $$V_e=[A_u^2+A_L^2+2A_uA_L\cos(\phi_u+\phi_L)]^{1/2} \quad (5)$$

and the overall video phase characteristic is given by $$\phi_e=\tan^{-1}\frac{A_u\sin\phi_u-A_L\sin\phi_L}{A_u\cos\phi_u+A_L\cos\phi_L} \quad (6)$$

From the above equations it may be concluded that a vestigial sideband system with conventional demodulation produces a quadrature component proportional to the numerator of Equation 4. This is the cause of the so-called quadrature distortion in vestigial sideband systems, further characterized by the harmonic component of the amplitude represented by the cos $2\omega t$ term in Equation 3. In presence of more than one signal frequency, the envelope amplitude $V_e$ also contains cross product terms of those frequencies. Since tan $\alpha$ of Equation 4 is a function of time, incidental phase modulation is produced.

At small modulation index Equation 5 shows that the envelope will have amplitude distortion, since $V_e$ will not in general be independent of $\phi_u$ and $\phi_L$, which depend upon the signal frequency $\omega$. That type of amplitude distortion can be corrected, at least in theory, by compensating equalization of the video signal, either ahead of the modulation stage in the transmitter or after demodulation in the receiver.

Since $\phi_e$ of Equation 6 is in general not proportional to signal frequency there will also be phase distortion even at small modulation index. The resulting delay time in a given system is a function of signal frequency only, and can be compensated by suitable phase equalizing networks in transmitter or receiver or both. See, for example, Kell and Fredenhall, "Standardization of the Transient Response of Television Transmitters," RCA Review, March 1949, pages 17 to 34. Also, see CCIR Recommendation No. 266 (Los Angeles, 1959 and Geneva, 1963). It is emphasized, however, that such equalizing techniques are not able to compensate fully the quadrature and phase distortion that increases with modulation index, as shown by Equations 3 and 4.

(B) Regenerated vestigial sideband

Referring to FIG. 3 there is shown the addition of two complementary vestigial sideband signals, each similar to that shown in FIG. 1 but mutually inverted with respect to the carrier frequency at B. The two complementary signals have carriers that coincide in frequency and phase, and the upper sideband from one circuit will be equivalent to the lower sideband from the other and vice-versa. Two such complementary sideband signals are represented schematically in FIG. 3, with common carrier frequency $f_p$, with frequency distributions $A_1$ and $A_2$ of conventional form, and with respective phase characteristics indicated at M and N.

The equation of the combined response $V_r$ for a regenerated sideband system for a single signal frequency $\omega$ now becomes, using the same terminology as in the derivation of Equations 2 to 6, $$V_r=E\Big[A_c \cos \omega_c t+\frac{mA_u}{2}\cos\{(\omega_c+\omega)t+\phi_u\} + \frac{mA_L}{2}\cos\{(\omega_c-\omega)t+\phi_L\} + A_c\cos\omega_c t+\frac{mA_u}{2}\cos\{(\omega_c-\omega)t-\phi_u\} + \frac{mA_L}{2}\cos\{(\omega_c-\omega)t-\phi_L\}\Big] \quad (2a)$$

$$=E\Big[2A_c\cos\omega_c t+\frac{X}{2}\{\cos(\omega_c+\omega)t+\cos(\omega_c-\omega)t\} - \frac{Y}{2}\{\sin(\omega_c+\omega)t-\sin(\omega_c-\omega)t\}\Big] \quad (7)$$

$$=E[2A_c+X\cos\omega t-Y\sin\omega t]\cos\omega_c t \quad (8)$$

where $$X=mA_u\cos\phi_u+mA_L\cos\phi_L$$

$$Y=mA_u\sin\phi_u-mA_L\sin\phi_L$$

An examination of Equations 7 and 8 and of their vector representation shown in FIG. 4 reveals the following:

(1) The modulation or signal vectors are symmetrical about the carrier vector. Hence there is no quadrature component.

(2) Equation 8 shows that the combined signal is equivalent to a double sideband modulation with a signal which is the resultant of two terms at right angles $A_u\sin\phi_u-A_L\sin\phi_L$ and $A_u\cos\phi_u+A_L\cos\phi_L$.

The envelope amplitude factor $V_{er}$ and phase characteristic $\phi_{er}$ for the regenerated sideband system may be derived from Equation 8 and are as follows:

$$V_{er}=[A_u^2+A_L^2+2A_uA_L\cos(\phi_u+\phi_L)]^{1/2} \quad (9)$$

$$\phi_{er}=\tan^{-1}\frac{A_u\sin\phi_u-A_L\sin\phi_L}{A_u\cos\phi_u+A_L\cos\phi_L}=\tan^{-1}(Y/X) \quad (10)$$

Equations 9 and 10 are seen to be similar to Equations 5 and 6 for the vestigial sideband case. However, there is one substantial difference in that Equations 5 and 6 apply only for small modulation index $m$, whereas Equations 9 and 10 have been obtained without making any approximation and hence apply for any modulation index.

With suitable design $\phi_u$ and $\phi_L$ are approximately proportional to the signal frequency in antisymmetric relation. Referring again to FIGURE 1, residual phase distortions are brought about by the non-linearity of the initial phase curve. In the regenerated sideband system the phase vs. frequency characteristic is the resultant of the vector sum of components of the same frequency with their amplitudes determined according to the system amplitude characteristic, e.g. points $c$ and $d$ in FIGURE 3

Figures 5, 6, 7:
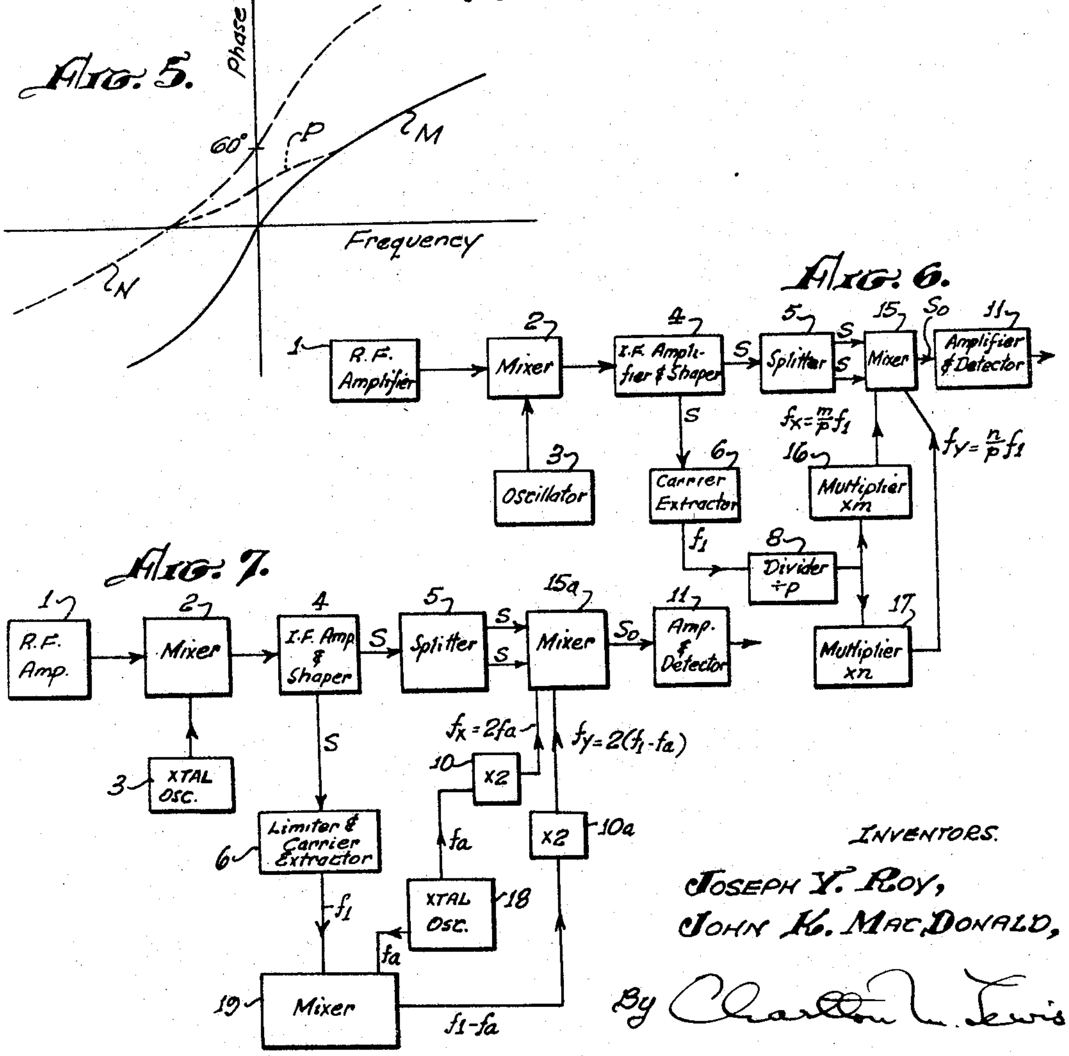
FIG. 5 represents graphically phase relations in addition of complementary sideband signals.
FIG. 6 is a block diagram representing the tuning and detector stages of a television receiver in accordance with one embodiment of the present invention.
FIG. 7 is a block diagram similar to FIG. 6 but showing another embodiment.

It is not necessary to add the signals with the picture carriers in the same phase. FIGURE 5 shows the result of adding two such waves with the relative phase of their picture carriers at 60°. Curve M represents a typical phase vs. frequency curve for a conventional system comprising a transmitter vestigial sideband filter and a receiver I.F. amplifier. Curve N is then typically the phase vs. frequency curve for the regenerated sideband of the present invention. The resultant phase vs. frequency curve after summation of the complementary signals includes the transition region P. The linearity of the overall phase vs. frequency curve NPN has been greatly improved as compared to curve M. FIG. 5 illustrates the principle by which improvement in linearity of the phase characteristic can in general be increased by suitable departure from phase equality of the two sideband signals that are combined. The optimum phase difference depends upon the detailed nature of the phase characteristic of the overall system, including transmitter, antenna equipment and receiver, and can best be determined by direct adjustment in each particular system. However, it will be noted that in order for this to be true, it is necessary that the two complementary signals to be added have identical amplitude characteristics and phase characteristics except for the frequency inversion of one signal relative to the other with respect to a common carrier frequency $f_c$. In the present invention identical amplitude characteristics will be normally achieved by providing only one vestigial sideband "shaping" filter which determines the amplitude characteristics of both signals, and by making the addition in a double sideband mixer. An examination of the characteristics of typical band pass filters in any electronic engineering handbook shows that if this amplitude condition is achieved then the phase requirement is met also for circuits of the minimum phase shift type.

In order for it to be possible to add two complementary vestigial sideband signals with optimum results, as shown in the foregoing, the following conditions must be met.

(1) The two carriers must be precisely co-incident in frequency at all times.

(2) For a given signal frequency the difference in the sideband frequencies, upper and lower, must be constant at all times.

(3) The carriers of the two signals which are added must remain in the same relative phase within a few degrees at all times.

Other relations that are preferably met will be brought out hereinafter.

Since a condition exists according to (1) above where zero tolerance is allowed on the relative frequencies of the picture carrier signals, it is evident that the two carrier signals to be combined will have to be locked in frequency and phase to the incoming signal. That may be done, for example, by obtaining the carrier signals from the incoming video signal or by means of an oscillator with suitable automatic frequency and phase control.

II.—ILLUSTRATIVE EMBODIMENTS OF THE INVENTION

(A) Principle of operation, Form (1), FIG. 6

FIG. 6 is a block diagram representing the radio freqency, intermediate frequency and detection stages of a television receiver in accordance with one embodiment of the present invention.

An R.F. amplifier 1, a first mixer 2, a crystal controlled oscillator 3, and an I.F. amplifier and shaper 4 are connected together in conventional manner, as shown. The first mixer 2 produces an intermediate frequency signal which is the difference between the incoming R.F. signal and the oscillator signal from 3. The I.F. amplifier and shaper 4, is adapted to produce an output signal S that is modified by the filtering action at 4 to reduce the amplitude of the vestigial sideband in accordance with standard television receiver practice, as indicated schematically at $A_1$ in FIG. 3.

The splitter 5 receives the video output signal S from 4 on intermediate carrier frequency $f_1$, and is adapted to produce a pair of like signals for feeding the second mixer 15. Mixer 15 includes two independent but preferably identical mixing channels and means for summing their outputs. The limiter and carrier extractor 6 also receives the output of I.F. amplifier 4 and produces an output comprising only the pure carrier at intermediate frequency $f_1$. That carrier is supplied to a frequency divider 8 with dividing factor $p$. The output of divider 8, which is a carrier signal of frequency $f_1/p$, is supplied in parallel to the $xm$ frequency multiplier 16 and to the frequency multiplier 17. The output of multiplier 16 at frequency $mf_1/p$ is designated $f_x$ and is supplied as input to one of the channels of mixer 15. The output of multiplier 17 at frequency $nf_1/p$ is designated $f_y$ and is supplied as input to the other channel of mixer 15. Each of those inputs referred to herein as injection frequencies, is separately mixed in 15 with the shaped vestigial sideband signal S. The resulting two signals $S_{01}$ and $S_{02}$ are then summed to produce the output $S_0$ from mixer 15, which is supplied as input to the amplifier and detector 11.

Mixer 15 includes filter or equivalent means for rejecting summation components other than those representing the polarities $f_x-S$ and $f_y+S$ from the respective channels. The first of those signals containing S in negative polarity, is a recreated suppressed sideband signal $S_{01}$ on a carrier of frequency $f_{01}=f_x-f_1$, while the second containing S in positive polarity, is a non-suppressed sideband signal $S_{02}$ on a carrier of frequency $f_{02}=f_y+f_1$.

The integral values of $p$, $m$ and $n$ are selected to satisfy the relation $$m-n=2p \qquad (11)$$

If that condition is satisfied, $$f_x-f_1=\left(\frac{m}{p}-1\right)f_1=\left(\frac{n}{p}+1\right)f_1=f_y+f_1$$

and $$f_x-f_y=2f_1 \qquad (12)$$

and the carrier frequencies $f_{01}$ and $f_{02}$ of the two complementary sideband signals in mixer 15 are identically equal. Proper phase relation is readily obtained between the two carriers by suitable design of the described frequency divider 8 and multipliers 16 and 17, which may include phase equalizing networks of suitable type. Thus, the primary requirements of the present aspect of the invention are met for adding two complementary sideband signals to produce a reconstituted double sideband signal $S_0$. That double sideband signal is supplied to the amplifier and detector 11, which may be of conventional type. The resulting demodulated signal is then employed in conventional manner. It is essentially free of phase and quadrature distortion for the reasons already discussed.

For a particular sideband or signal frequency $f_s$, the frequencies of the two complementary sideband signals in mixer 15 may be represented as $$\frac{m}{p}f_1-(f_1+f_s)$$

and $$\frac{n}{p}f_1+(f_1+f_s) \qquad (13)$$

assuming for illustration that the lower sideband was suppressed. It is evident that if Equation 11 is satisfied the difference between the two frequencies 13 will be $2f_s$, which is independent of any small variations in the carrier frequencies.

Assume that due to various causes the intermediate carrier frequency $f_1$ drifts by an amount $\Delta f_1$. The mixer output frequencies may be expressed as follows:

$$f_{01}=\frac{m}{p}(f_1+\Delta f_1)-(f_1+\Delta f_1)$$

$$f_{02}=\frac{n}{p}(f_1+\Delta f_1)+(f_1+\Delta f_1)$$

If the condition 11 is satisfied, $$f_{01}-f_{02}=(f_1+\Delta f_1)\frac{m-p}{p}-(f_1+\Delta f_1)\frac{n+p}{p}$$

$$=(f_1+\Delta f_1)\frac{(m-n-2p)}{p}=0$$

Hence the carrier frequencies of the two complementary sideband signals $S_{01}$ and $S_{02}$ are coincident at all times although the input carrier frequency drifts.

An important feature of the embodiment represented in FIG. 6 is that when $m$, $n$ and $p$ are selected to satisfy Equation 11 and also in such a way that $m/p$ and $n/p$ are both non-integral, the output carrier frequency $f_0$ is not harmonically related to $f_1$, $f_x$ or $f_y$. For example, an acceptable solution to Equation 11 is obtained by selecting $p=5$, $n=2$ and $m=12$. The carrier frequency $f_0$ of the output double sideband signal $S_0$ is then $7f_1/5$.

A further example is provided by selection of $p=3$, $m=8$ and $n=2$. With those values $f_0=5f_1/3$. In that illustrative system, if the intermediate frequency $f_1$ is 27 mc./s., for example, the two mixing frequencies $f_x$ and $f_y$ are 72 mc./s. and 18 mc./s., respectively, and the output carrier frequency $f_0$ is 45 mc./s. Alternatively, with $f_1=27$ mc./s. and with $m=12$, $n=2$ and $p=5$, the output carrier frequency is $f_0=37.8$ mc./s.

It may further be desirable that $f_x$ and $f_y$ have no harmonic relation between them. That may be accomplished, for example, together with the above described conditions, by selecting the divider and multipliers so that $p=2$, $m=7$ and $n=3$, giving an output carrier frequency $f_0=5f_1/2$. Those specific selections are merely illustrative, and indicate the wide variety of possible choices by which special requirements and conditions can be met.

The system shown in block form in FIG. 6 may be modified, if desired, by designing the $f_y$ channel of mixer 15 to select as output the frequency component corresponding to $f_1-f_y$, rather than $f_y+f_1$ as described above. With that polarity of signal summation, the condition for identical carrier frequencies $f_{01}$ and $f_{02}$ in the previous notation is the following modification of the previous Equation 11:

$$m+n=2p \qquad (11a)$$

so that $$f_x+f_y=2f_1 \qquad (12a)$$

An illustrative specific selection of frequency factors for carrying out that form of the invention is $p=5$, $m=8$ and $n=2$, leading to an output carrier frequency $f_0=3f_1/5$. Further, with $p=5$, $m=7$ and $n=3$, $f_0=2f_1/5$.

(B) Principle of operation, Form (2), FIG. 7

A further illustrative embodiment of the invention is represented in block form in FIG. 7. That embodiment illustrates the very considerable freedom that is available to the designed in selecting specific values of the injection frequencies that have been designated $f_x$ and $f_y$. In the system of FIG. 7 those injection frequencies are respective linear combinations of the initial carrier frequency $f_1$ and an auxiliary frequency $f_a$, which is typically generated by a local oscillator. By use of one or more such auxiliary frequencies the available selection of acceptable injection frequencies for carrying out the invention may be greatly increased. By imposing suitable restrictions upon the coefficients by which the two injection frequencies are related to $f_1$ and $f_a$ the previous criterion may be met, namely, that the derived complementary sideband signals to be combined have carrier frequencies that are identically equal. That is to say, the output carrier frequencies $f_{01}$ and $f_{02}$ for the two mixer channels preferably remain identically equal not only despite variations of $f_1$, but also despite variations in the value of the auxiliary frequency $f_a$.

Referring to FIG. 7, R.F. amplifier 1, mixer 2, oscillator 3, I.F. amplifier and shaping filter 4, splitter 5 and mixer 15*a* are typically of the same general construction and function in essentially the same manner as already described in connection with FIG. 6. Limiter and carrier extractor 6 produces and delivers to the mixer 19 a pure carrier at the intermediate frequency $f_1$ of the system. The crystal controlled oscillator 18 produces an auxiliary or local frequency $f_a$, which frequency is delivered both to the mixer 19 and to the frequency doubler 10. Mixer 19 develops an output signal of frequency $f_1-f_a$ which is supplied to the frequency doubler 10*a*. The outputs of frequency doublers 10 and 10*a* are simple carrier signals of frequencies $2f_a$ and $2(f_1-f_a)$, respectively. Those signals are delivered as injection signals $f_x$ and $f_y$ to the respective channels of mixer 15*a*, performing functions similar to those of the previously described mixer 15. Mixer 15*a* is typically like mixer 15 of FIG. 6, except that its second channel is designed to produce a signal corresponding to the difference of the two input signal frequencies rather than their sum. The output of the first channel of mixer 15*a* is a recreated suppressed sideband signal having a carrier frequency $f_{01}=f_x-f_1=2f_a-f_1$. The output of the second mixer channel is a non-suppressed sideband signal having a carrier frequency $f_{02}=f_1-f_y=2f_a-f_1$. Those two carrier frequencies of the complementary sideband signals are therefore identically equal as in the previous embodiment, permitting the summation of those signals to produce a reconstituted double sideband signal $S_0$ for supply to amplifier and detector 11.

If the two injection frequencies of the present embodiment are expressed generally as linear combinations of $f_1$ and $f_a$ in the form $$\begin{aligned} f_x&=af_1+bf_a \\ f_y&=cf_1+df_a \end{aligned} \qquad (14)$$

it will be seen that the specific embodiment just described with reference to FIG. 6 represents the coefficient values $a=0$, $b=c=2$ and $d=-2$. More generally, with the described summation polarity for mixer 15*a*, the two derived signals $f_{01}$ and $f_{02}$ will have identically equal carrier frequencies provided $$a+c=2 \quad \text{and} \quad b=-d \qquad (15)$$

On the other hand, if a mixer with the polarity of summation described for mixer 15 of FIG. 6 is employed in a system of the general type shown in FIG. 7, then the conditions corresponding to 15 are:

$$a-c=2 \quad \text{and} \quad b=d \qquad (15a)$$

The conditions 15*a* may be met, for example, by selecting as coefficients in 14 $a=2$, $b=d=1$ and $c=0$, so that the injection frequencies are $f_x=2f_1$ and $f_y=f_a$. The carrier frequency of the reconstituted double sideband signal is then $f_0=f_1+f_a$. The examples given above lead to an output carrier frequency that is harmonically independent of all the principal frequencies in the system, including the locally generated auxiliary frequency $f_a$.

Not all sets of coefficients satisfying the conditions 15 or 15*a* will avoid harmonic relations among the principal frequencies of the system. However, many different sets are available that do eliminate such harmonic relations, thereby reducing shielding problems. Selection may be made from among such sets to satisfy additional criteria that may be imposed by specific conditions of operation of a particular system.

It will be recognized that the coefficients *a* and *c* of Equation 14 need not be integral, but may involve fractions such as the factors $m/p$ and $n/p$ of the system of FIG. 6. For that particular form of the coefficients *a* and *c* it will be noted that the conditions expressed by Equations 11 and 11*a* may be considered to represent special cases of the relations (15*a*) and (15), respectively, in which *b* and *d* are both zero.

(C) Description of receiver corresponding to Form (1)

Figure 8:
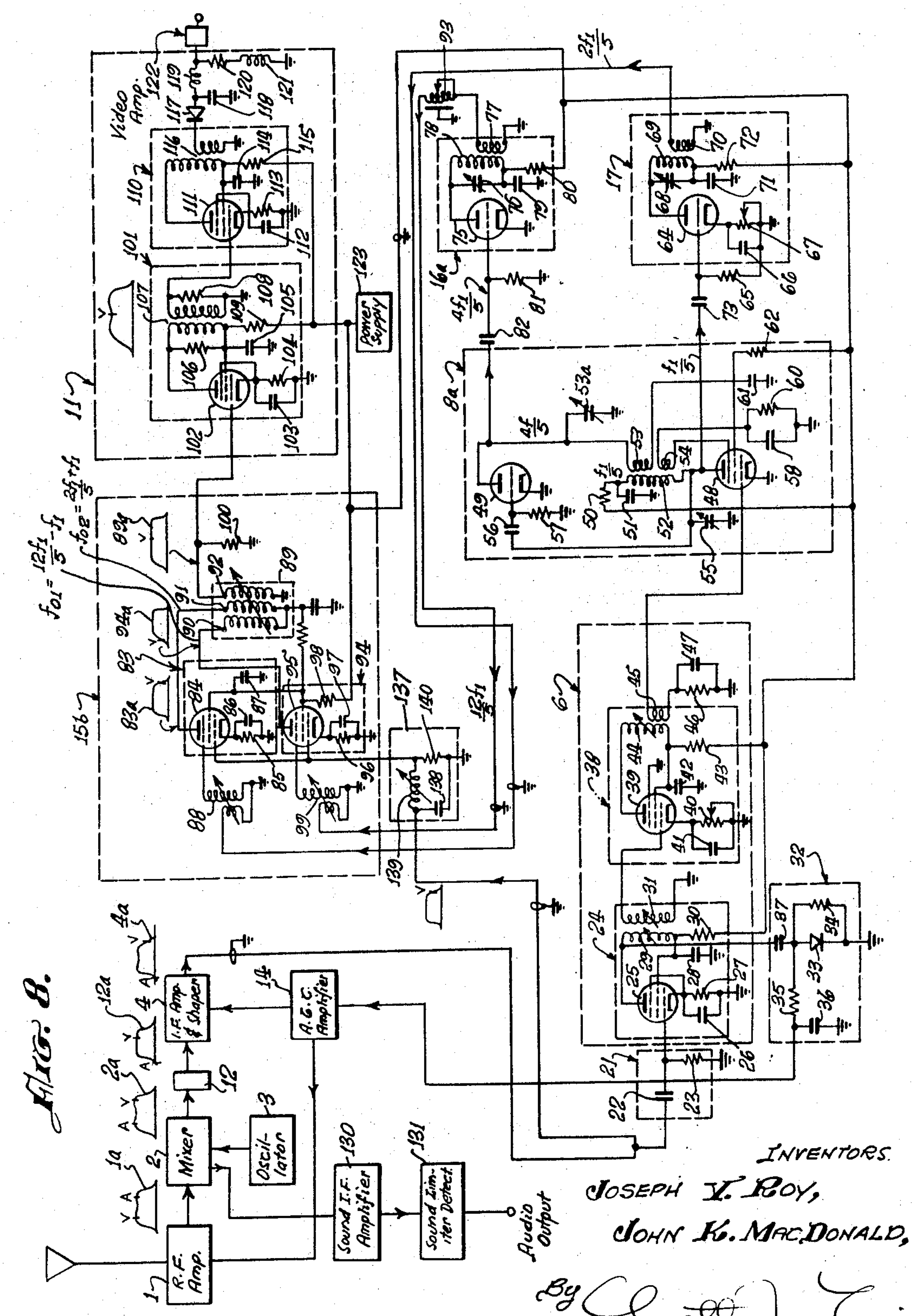
FIG. 8 is a schematic circuit diagram of part of a television receiver having tuning and detection stages in accordance with the block diagram of FIG. 6.

Referring to FIG. 8, there is shown in more detail the tuning and detector stages of a television receiver based on the embodiment of the invention already described in connection with FIG. 6. In FIG. 8 many of the numbered boxes shown in solid and dot-dash lines correspond generally to the similarly designated sub-circuits in FIG. 6. The incoming signal is fed into the R.F. amplifier 1, whose output has an amplitude-frequency spectrum 1*a* as indicated adjacent said output, with video and audio carriers indicated at V and A. That signal is supplied to a mixer 2 and the I.F. output from mixer 2, having the inverted spectrum indicated at 2*a*, is passed through an audio carrier trap 12, wherein the sound content is removed from the signal, as shown in the adjacent waveform 12*a*. The sound signal is extracted from mixer 2 and fed to a sound amplifier 130 followed by the sound limiter and detector 131.

After the sound signal has been removed from the video signal in trap 12, the video signal is fed to the I.F. amplifier and shaper 4 where the signal frequency spectrum is shaped as shown on FIG. 8 at 4*a*.

The I.F. amplifier and shaper 4 is connected and responsive to a control signal from A.G.C. amplifier 14 so that the output of the former will remain constant with varying input signals. The I.F. amplifier 4 has a low impedance R.F. output circuit adapted to be accommodated by a standard co-axial cable.

The output of the I.F. amplifier and shaper 4 is fed initially to two points: to a broadband network 137 formed by 138–139–140 and to a bridging network 21 formed by 22 and 23. The signal is, secondly, fed from network 137 to first and second mixer networks 83 and 94; of mixer 15*b*; and from the bridging network 21 to carrier extractor 6, comprising the narrow band amplifier 24 and limiter 38. Amplifier 24 includes tube 25 and associated components 26–27–28–29–30 and 31, adapted to produce a high level output signal which is applied to an A.G.C. detector 32 formed by 33–34–35–36 and 37. The signal from amplifier 24 is also applied via coils 29 and 31 to the gated beam limiter 38 constituted by tube 39 with its associated components 40–41–42–43–44 and 45. Potentiometer 40 is adjusted for a bias lying between the cutoff point and the saturated point of the tube 39 characteristic; this assures maximum amplitude modulation rejection.

Coil 45 feeds a signal of intermediate carrier frequency free of amplitude modulation to a frequency divider and quadrupler network formed by divider pentode tube 48 and quadrupler triode tube 49 and associated components 50–51–52–53–53*a*–54–55–56–57–58–60–61 and 62. The circuit provides feedback between the anode and suppressor grid of tube 48. The frequency divider and quadrupler network performs, among other functions, that of divider 8 of FIG. 6, and is designated 8*a*. It operates in the following way: The coil 45 feeds the intermediate frequency video carrier signal to the grid of tube 48, where associated resistor 46 and capacitor 47 provide self-bias to the grid. Coil 52, and link coil 54 oscillate at ⅕ the intermediate frequency $f_1$. Stable operation of the divider requires a strong 4th harmonic of $f_1/5$, which then beats with the input signal $f_1$ to reinforce the resonance of the circuit at $f_1/5$; an amount of the oscillator voltage is extracted at the plate of tube 48 and fed to the quadrupler tube 49 through a capacitor 56 and associated grid resistor 57. A tuned circuit formed by capacitor 53*a* and coil 53 injects the required 4th harmonic into the oscillator coils 52 and 54.

A frequency doubler network 17, comprising tube 64 and associated components 66–67–68–69–70–71 and 72, is adapted to receive, via capacitor 73, with associated resistor 65, energy from the plate of the divider tube 48 and at a frequency of ⅕ of the I.F. video carrier signal. Potentiometer 67 is used to adjust the output of the tube 64.

A frequency tripler network 16*a*, comprising tube 75, and associated components 76–77–78–79 and 80, is adapted to receive, via capacitor 82, and associated resistor 81 energy from the plate of the quadrupler tube 49, which energy is at a frequency of ⅘ of the I.F. video carrier signal. Tripler network 16*a* corresponds only partially to $\times m$ multiplier 16 of FIG. 6 since in FIG. 8 the $\times 12$ frequency multiplication is performed partly by tube 49 which functions also as part of divider 8*a*.

A first intermediate mixer network 83 comprising pentode tube 84 and associated components 85, 86 and 87, is adapted to receive an R.F. signal from coil 88 which is fed from coil 70 in the doubler network 17. Mixer 83 adds this R.F. signal to the video intermediate frequency fed by the broadband network 137. A trifilar coil 89, comprising 90–91 and 92, has its coil 91 connected to first mixer tube 84, which generates therein a video signal at a second intermediate frequency of $(2/5)f_1+f_1$, and having a frequency spectrum typically as indicated at 83*a*.

A second intermediate mixer network 94 comprising pentode tube 95 and associated components 96, 97 and 98 is adapted to receive an R.F. signal from the tripler network 16*a* via coil 99. A delay line 93 is included to phase the R.F. signal from the output of the tripler network 16*a*. The second intermediate mixer 94 having received the R.F. signal from coil 99, this signal is then mixed with the video intermediate frequency from the broadband network 137. The resultant signal from tube 95, represents the difference frequency of the two components, and has an inverted frequency spectrum as indicated at 94*a*. That signal is fed to coil 90 in the trifilar coil 89. The two signals thus presented to trifilar coil 89 are of the same amplitude and frequency and are in proper relative phase. Resistor 100 loads the trifilar coil 89 so that the latter becomes a broadband resonant circuit. The circuitry indicated at 15*b* in FIG. 8 incorporates the splitter 5 as well as mixer 15 of FIG. 6.

The output signal from trifilar coil 89, having the waveform indicated at 89*a*, is fed to an amplifier 101, comprising tube 102 and associated components 103–104–105–106–107–108 and 109. Resistors 106 and 108 load the coil 107 and the latter then becomes a double tuned broadband resonant circuit.

The output signal from amplifier 101 is fed to a further amplifier 110 comprising a tube 111 having associated components 112–113–114–115 and 116. The output from coil 116 of amplifier 110 is fed to a detector 117, having associated filter components 118–119–120 and 121, and thence to the video amplifier 122. Power for the operation of the unit is provided by the power supply 123.

The above-discussed circuit, therefore, recreates the suppressed sideband signal from the non-suppressed sideband signal and combines the respective two signals and presents the double sideband signal thus produced to the detector, whereby the associated video carrier signals coincide in frequency and have proper relative phase. The resultant demodulated output signal is therefore substantially free of phase and quadrature distortion.

It will be obvious that the inclusion of the A.G.C. amplifier 14, A.G.C. detector 32, and amplifier 110 are not essential to the invention. Other varations in the subcircuitry, will appear to those skilled in the art, without departing from the spirit of the invention.

(D) Description of receiver corresponding to Form (2)

Figure 9:
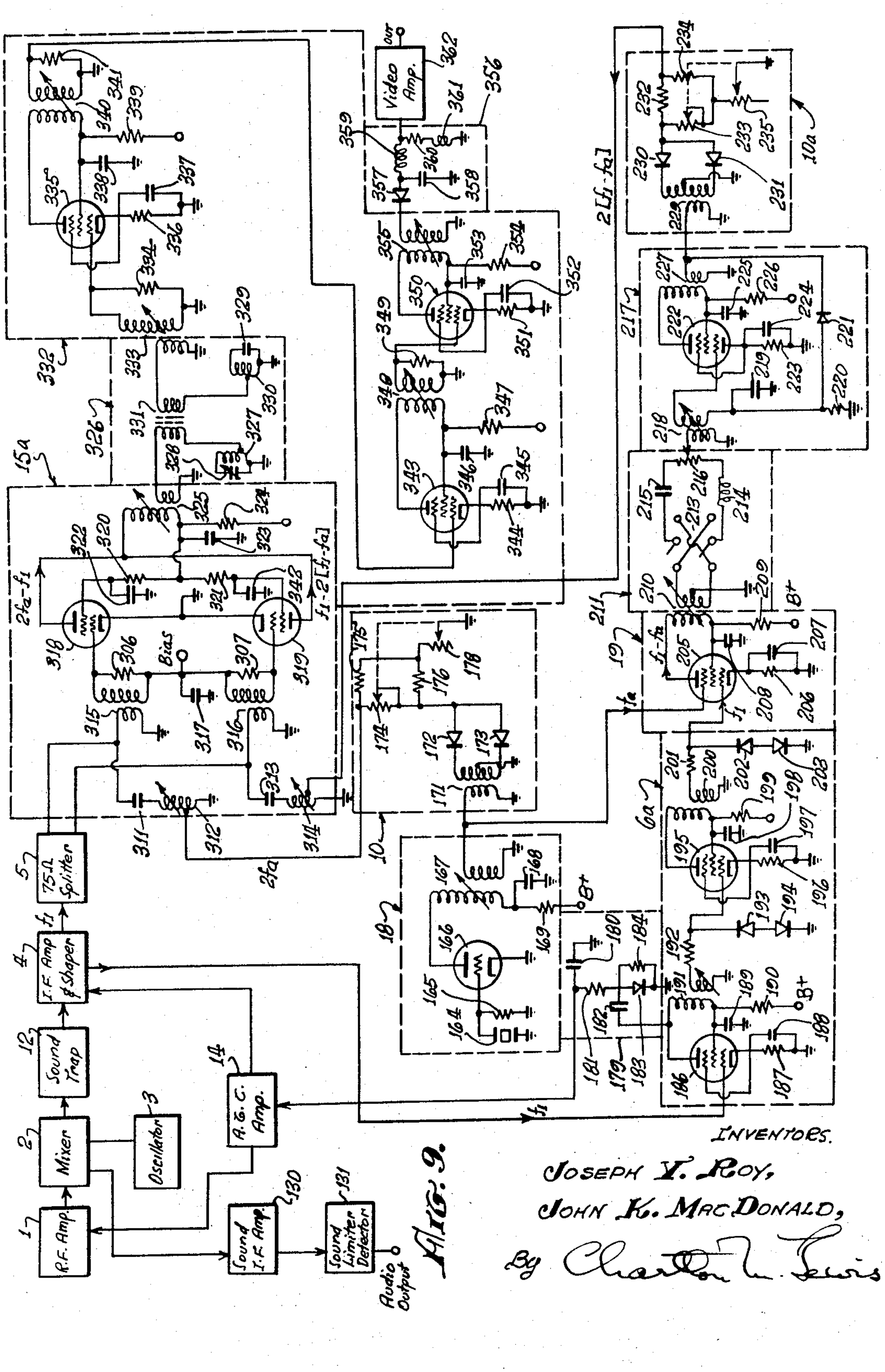
FIG. 9 is a schematic circuit diagram corresponding to that shown in FIG. 8, but in accordance with the embodiment shown in FIG. 7.

Referring to FIG. 9, blocks Nos. 1, 2, 3, 4, 12, 14, 130 and 131 represent the stages of a standard T.V. receiver as already described above. The output of the I.F. amplifier and shaper 4 feeds a splitter 5, which provides two outputs for the double mixer 15*a*. The I.F. amplifier and shaper 4 also feeds a signal to the video carrier limiter amplifier 6*a* which corresponds to 6 of previous figures and removes all the modulation on the carrier. The first stage of this limiter amplifier is a pentode 186 with its associated components 187, 188, 189 and 190. An automatic gain control detector 179 is connected at the plate of amplifier 186. The detector is composed of components 180, 181, 182, 183 and 184. The voltage obtained from the detector is fed to the A.G.C. amplifier 14. The tuned circuit 191 in the plate circuit of the pentode 186 is of the narrow band type and passes the video carrier signal only. Resistor 192 and diodes 193 and 194 limit the signal and partially remove the modulation on the carrier. A second pentode 195 with its associated components 196, 197, 198, 199 and 200 amplifies the video carrier signal again and feeds it is to second limiter composed of resistor 201 and diodes 202, and 203; in this last limiter, the rest of the modulation on the carrier is removed. This signal at frequency $f_1$ is fed to a frequency converter or mixer 19 with its associated components 205, 206, 207, 208 and 209. The converter 19 also receives a signal $f_a$ from the crystal oscillator 18 with its associated components 164, 165, 166, 167, 168 and 169. The tuned circuit 210 of converter 19 is tuned to $f_1-f_a$. This new signal is fed to a phase shifter circuit 211 comprising switch 213, coil 214, capacitor 215, and resistor 216. The purpose of this phase shifter circuit is to vary the phase of $(f_1-f_a)$ so that the two I.F. signals in the plate circuit of mixer 15*a* are in proper relative phase and add.

The $f_1-f_a$ signal is then fed to an amplifier 217 composed of pentode 222 and associated components 218, 219, 223, 224, 225, 226 and 227. The detector circuit composed of diode 221 and resistor 220 provides automatic gain control of the pentode to correct for amplitude variations which occur when the phase control 216 is varied. Amplifier 217 feeds a frequency doubler 10*a* composed of transformer 229, diodes 230 and 231, and amplitude control 232, 233, 234 and 235. The output frequency of the doubler 10*a* is $2(f_1-f_a)$; this signal is fed to coil 314 and condenser 313 coupled via the transformer 316 to the grid circuit of pentode 319 in mixer 15*a* where it subtracts from the I.F. signal $f_1$, also fed to the grid circuit of pentode 319 through transformer 316.

Crystal oscillator 18 which we have described earlier also feeds a doubler 10 composed of transformer 171, diodes 172 and 173, and amplitude control 174, 175, 176 and 178. The output frequency of doubler 10 is $2f_a$; this signal is fed to coil 312 and capacitor 311, coupled to the grid circuit of pentode 318 is mixer 15*a* to which the I.F. signal $f_1$ is also fed through transformer 315. In pentode 318, the I.F. signal $f_1$ will subtract from the signal $2f_a$. Mixer 15*a* is composed of two pentodes 318 and 319 with their associated components 317, 320, 321, 322, 323, 324, 306, 307 and 342 and the components described earlier: coils 312 and 314, transformers 315 and 316, capacitors 311 and 313. The output circuit 325 of the mixer 15*a* contains two I.F. signals which are complementary sideband signals having the identically equal carrier frequencies $2f_a-f_1$ and $f_1-2(f_1-f_a)$. These two signals add together and are fed to a second I.F. amplifier 332 through filter 326 which attenuates the unwanted summation frequencies that come from mixer 15*a*, such as $2(f_1-f_a)$ and $f_1+4(f_1-f_a)$. The filter 326 is composed of transformer 331, high "Q" circuit 327 and 328 and a second high "Q" circuit 329 and 330. The second I.F. amplifier 332 is composed of three pentodes 335, 343 and 350 with their associated components 334, 336, 337, 338, 339, 341, 344, 345, 346, 347, 349, 351, 352, 353 and 354. The three circuits 340, 348 and 355 are stagger tuned to provide a band width of approximately 10 mc./s. The second I.F. amplifier 332 feeds a detector stage 356 composed of diode 357 and filter circuit 358, 359, 360 and 361. This detector is followed by a standard video amplifier 362.

(E) Illustrative modifications

It will be understood that the essence of the present invention can be carried out through a very wide variety of detailed procedures, some involving only small modifications of the described systems and some superficially quite different. A few such modifications will be described as illustrations, but without any attempt to suggest all possibilities.

It will be noted, for example, that in the system of FIGS. 7 and 9 the auxiliary frequency $f_a$ is actually utilized in mixer 15*a* only after multiplication by two. Hence alternative instrumentation can employ an oscillator at 18 having an initial frequency $2f_a$. Frequency doubler 10 is then unnecessary and frequency doubler 10*a* may be removed from the position shown and inserted in the line between carrier extractor 6 and mixer 19. Frequency $f_1$ is thereby doubled before summation with the oscillator frequency. The resulting values of the two injection frequencies $f_x$ and $f_y$ supplied to mixer 15*a* may remain the same as previously described.

Figure 10:
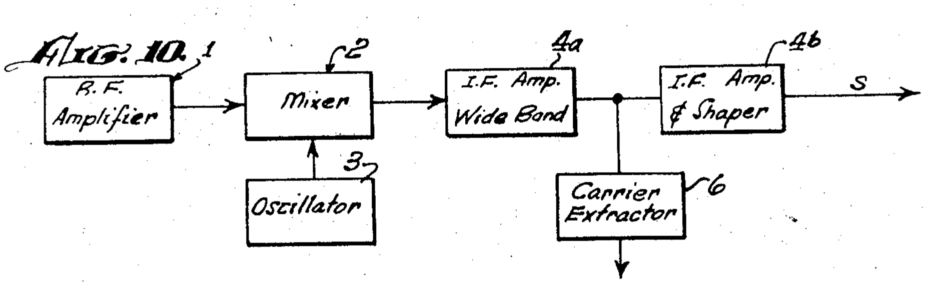
FIG. 10 is a fragmentary block diagram representing a modification.

FIG. 10 illustrates an aspect of the invention which reduces the possibility of introducing objectionable incidental phase modulation in the carrier extracting circuits. The transmitted vestigial sideband signal is ordinarily essentially double sideband for an appreciable range of signal frequencies, typically up to a value of about 750 kc./s. As shown in FIG. 10, any intermediate frequency amplifier that is employed ahead of the carrier extractor is designed with a wide enough passband to accommodate essentially the full transmitted vestigial sideband signal, as indicated at 4*a*. The signal from which the carrier is to be extracted is obtained ahead of the I.F. amplifier portion 4*b* that includes the shaping circuits, by which the vestigial sideband is attenuated to the form indicated schematically by the extreme left hand portion of curve $A_1$ in FIG. 3. By thus supplying to the carrier extractor 6 as much of the vestigial sideband as is available from the transmission, the preferred circuit of FIG. 10 minimizes incidental phase modulation in the carrier extractor. Although not shown explicitly, that circuit feature is preferably employed in the systems illustrated herein whenever carrier extraction from the incoming signal is required.

Figure 11:
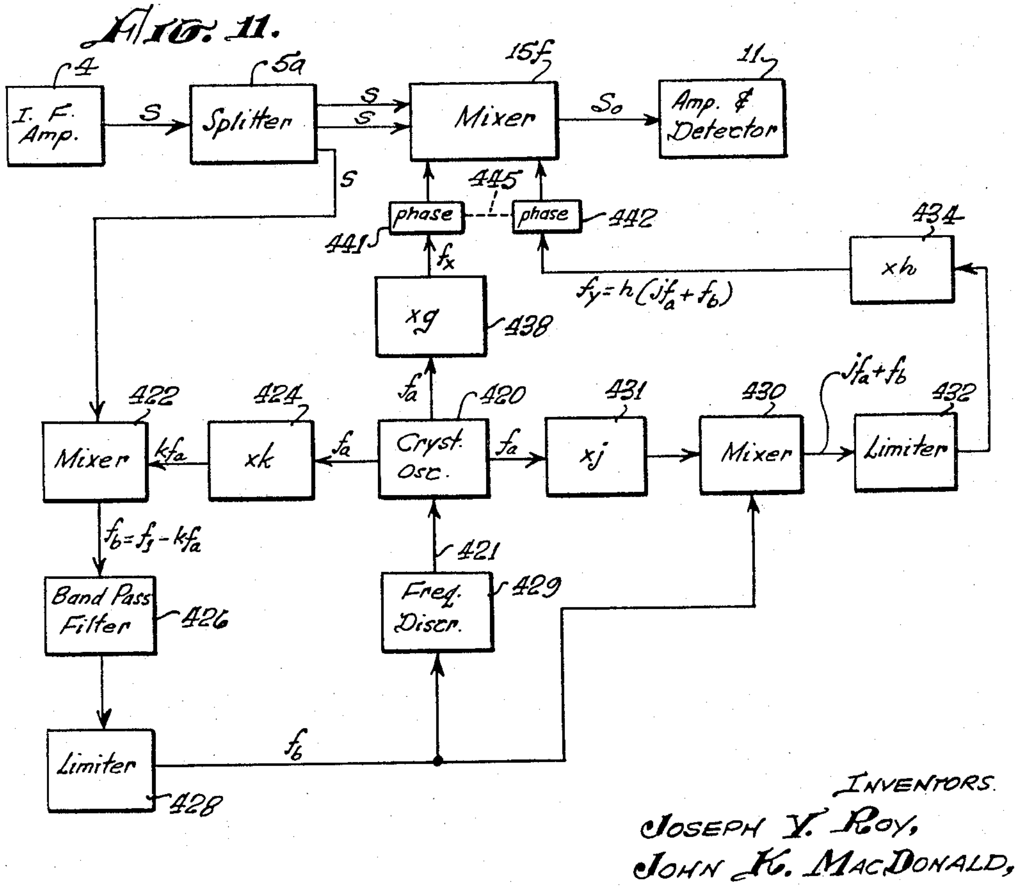
FIG. 11 is a block diagram representing a further modification.

FIG. 11 represents an illustrative system utilizing a frequency controlled oscillator 420 for which the reference frequency is developed in a particularly effective manner that employs an improved method of carrier extraction. In that system the input video signal S with carrier frequency $f_1$, typically from I.F. amplifier 4, is supplied via splitter 5*a* to the two channels of mixer 15*f*, which is similar in function to the similarly designated mixers of the previous embodiments. A third portion of signal S is supplied to the mixer 422. The crystal oscillator 420 is of the known frequency controlled type, producing an output frequency $f_a$ that is continuously variable in response to a control signal supplied via the line 421. The output signal from the oscillator is supplied to the multiplier 424 which multiplies the frequency by a factor $k$, and thence to mixer 422. The frequency $kf_a$ is so chosen with relation to $f_1$ that the difference or beat frequency $f_b$ at the output from mixer 422 has a selected nominal value that is low compared to $f_1$, that is, $f_b$ is less than $f_1$ by a factor of at least about 100. For receiving conventional color television signals it is ordinarily preferred that $f_b$ have a value between about 20 kc./s. and about 500 kc./s., whereas $f_1$ is typically about 50 mc./s. The output $f_b$ from mixer 422 is passed through the band pass filter 426, which removes the sidebands at $f_b$=15.750 kc./s. and all higher signal frequencies. Any remaining amplitude modulation is then removed by the limiter 428, which is of suitable design to produce minimum phase modulation. The resulting wave from limiter 428 is essentially a pure sine wave with frequency $f_b=f_1-kf_a$ and therefore represents the carrier frequency $f_1$ of the original vestigial sideband signal. However, since the carrier extraction in filter 426 is carried out at the relatively low frequency $f_b$, the phase characteristics of the filter are relatively insentive to such factors are carrier frequency variations. The sidebands at 15.750 and higher frequencies are thus removed with minimum incidental phase modulation of the signal.

The resulting sine wave at frequency $f_b$ is supplied from limiter 428 to the frequency discriminator 429, which is centered on the nominal value selected for $f_b$ and produces on the line 421 a voltage proportional to any departure of $f_b$ from its nominal value. That voltage is supplied as control signal to oscillator 420, maintaining the beat frequency $f_b=f_1-kf_a$ constant. That maintains the carrier of the signal entering filter 426 accurately centered with respect to the band pass filter, virtually eliminating incidental phase modulation.

The sine wave beat frequency $f_b$ is also supplied from limiter 428 to the single sideband suppressed carrier modulator 430, where it is combined with a multiple $j$ of the frequency $f_a$, received from oscillator 420 via the frequency multiplier 431. The resulting sum frequency $jf_a+f_b$ is limited at 432 to remove any slight ripple it may contain. The resulting sine wave is multiplied by the integer $h$ at frequency multiplier 434, producing one of the injection frequencies $f_y=h[f_1-(k-j)f_a]$ for supply to one channel of mixer 15*f*.

The output of oscillator 420 is multiplied by the factor $g$ at 438 to produce the other injection frequency $f_x=gf_a$.

With that illustrative arrangement, the initial video signal S is subtracted from $f_x$ in one channel of mixer 15*f* to recreate the suppressed sideband on a carrier frequency $$f_{01}=gf_a-f_1$$

while $f_y$ is subtracted from S in the other channel to produce a non-suppressed sideband signal on the carrier frequency $$f_{02}=f_1-h[f_1-(k-j)f_a]$$
$$=h(k-j)f_a-(h-1)f_1$$

If $h=2$ and $g=h(k-j)$, those two carrier frequencies are identically equal, and the two complementary sideband signals can be added in the manner already described to produce a double sideband signal for amplification and demodulation at 11.

Illustrative values for the factors $g$, $h$, $j$ and $k$ to satisfy the relations just given are $g=8$, $h=2$, $j=1$ and $k=5$. The oscillator frequency $f_a$ is then $(f_1-f_b)/5$ and the double sideband output to the detector has a carrier frequency $f_0=3f_1/5-8f_b/5$. For example, if $f_1$ has the conventional intermediate frequency value 45,750 kc./s. and if $f_b$ at band pass filter 426 is assigned the relatively low value 20 kc./s., the local oscillator frequency $f_a$ will be 9,146 kc./s. and the output double sideband signal frequency $f_0$ will be 27,418 kc./s. On the other hand, a more moderate filter frequency $f_b$=100 kc./s, say, is obtainable with $f_a$=9,130 and $f_0$=27,290 kc./s.

A lower output frequency $f_0$ is obtainable by different selection of the multipliers, for example, by taking $g=4$, $h=2$, $j=1$ and $k=3$. With those values, and with $f_1$=45,750 as before, and $f_b$=21 kc./s., the oscillator frequency is 15,243 and the output frequency 15,222 kc./s. On the other hand, with the relatively high value of 600 kc./s. for $f_b$, $f_a$ is 15,050 and $f_0$ is 14,450. Many other combinations of multipliers and frequency values may be emp'oyed, providing a wide variety of frequency relationships from which specific requirements and preferences may be satisfied. Also, for example, if the single sideband suppressed carrier modulator or mixer at 430 is designed to select the difference between the input frequencies, rather than their sum as described above, the two output frequencies $f_{01}$ and $f_{02}$ may be made equal by selecting $g=h(k+j)$ and by adding $f_y$ and video signal S, instead of subtracting them as in FIG. 11.

Figure 12:
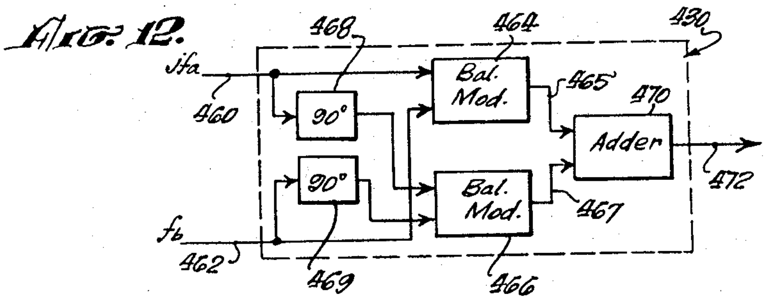
FIG. 12 is a block diagram representing a modulator.

To minimize the possibility of incidental phase modulation resulting from filter 426 and to insure optimum elimination of any incidental phase modulation of the incoming signal, it is desirable that the filter frequency $f_b$ be only slightly greater than the line repetition frequency, normally 15.750 kc./s., which is the lowest frequency component at which there is any significant amplitude that represents phase modulation. Mixer 430 of FIG. 11 may be of any suitable type that produces the selected sum or difference component without undue incidental phase modulation. For example, if the filter frequency $f_b$ is sufficiently high, it may be feasible to employ at 430 a conventional mixer with a suitable filter for selecting the sum frequency, say, and for rejecting the difference frequency and any transmitted input components. However, particularly when $f_0$ is relatively low, the mixing step indicated at 430 is preferably performed by a single sideband suppressed carrier modulator of double balanced type, which directly supplies to limiter 432 only the selected one of the two sidebands $jf_a+f_b$ and $jf_a-f_b$ without requiring any filtering step. FIG. 12 is a block diagram representing a typical modulator of suitable type. The first balanced modulator 464 receives both input signals, $jf_a$ on the line 460 and $f_b$ on the line 462, and produces on the line 465 two signals of frequencies corresponding respectively to the sum and difference of the input frequencies. The second balanced modulator 466 receives the two input signals after they have been shifted in phase through 90° by the respective phase shifting networks indicated at 468 and 469. The output from modulator 466 on the line 467 then comprises both sum and difference frequencies, but one of those frequencies is shifted in phase through 180° and the other has the same phase as the corresponding output signal from first modulator 464. When the signals on lines 465 and 467 are added at 470, the two signals of one frequency cancel, leaving as output only the desired single sideband. The latter corresponds to either the difference or the sum of the input frequencies according as the 90° phase shifts produced at 468 and 469 are in the same or in opposite senses.

As explained above in connection with FIG. 5, it has been found that, when two complementary sideband signals are combined to produce a complete double sideband signal, distortion due to non-linearity of their phase vs. frequency characteristics can be greatly reduced by modifying the relative phase of the two complementary sideband signals so that there is a suitable difference of phase between them.

Such phase adjustment is obtainable by varying the relative phase of the two injection frequencies. For example, the phase adjusting circuit shown illustratively at 211 in FIG. 9 alters the phase of injection frequency $f_y$ and may be employed for producing a desired phase difference between the two complementary sideband signals that are produced and combined in mixer 15$a$. More generally, FIG. 11 shows phase adjusting circuits 441 and 442 in the input lines for both injection frequencies to mixer 15$f$. Those two phase shifting devices may be coupled together as indicated schematically at 445 to drive them equally in opposite senses, if desired. However, we have found that it is ordinarily sufficient, and it is therefore normally preferred, to provide such a phase adjustment for only one injection frequency. The optimum setting of that adjustment typically depends upon many different factors, including both the transmitting and receiving stations. Hence it is ordinarily most effective to set the phase difference empirically for optimum reception rather than solely by theory or calculation.

Although in the preceding description the carrier frequency $f_1$ has been described illustratively as representing the regular I.F. frequency of a television receiver, that is not necessarily the case. For some types of reception $f_1$ may be the carrier frequency of the incoming signal, or it may be either higher or lower than the conventional I.F. frequency.

The various embodiments of the present invention that have been described above are intended only as illustration, and not as a limitation upon the proper scope of the invention, which is defined in the appended claims.

We claim:

1. The method of demodulating a vestigial sideband signal, comprising in combination producing first and second injection signals having frequencies that are equal to the carrier frequency of the vestigial sideband signal multiplied by respective fractions having a common integral denominator and different integral numerators, one of the fractions being equal to the difference between the other fraction and 2, mixing the vestigial sideband signal with the respective injection signals to produce complementary sideband signals on a common carrier frequency different from the sideband signal, summing the two complementary sideband signals to produce a double sideband signal, and demodulating the double sideband signal.

2. The method defined in claim 1, and wherein the sum of said fractions is 2.

3. The method defined in claim 1, and wherein the difference of said fractions is 2.

4. The method defined in claim 1, and wherein the carrier frequency of said complementary sideband signals is harmonically unrelated to the injection signal frequencies and to the carrier frequency of the vestigial sideband signal.

5. The method of demodulating a vestigial sideband signal, comprising in combination producing first and second injection signals having frequencies that are spaced unsymmetrically with respect to the carrier frequency of the vestigial sideband signal and that differ in frequency from each other by twice the carrier frequency of the vestigial sideband signal, combining the vestigial sideband signal with the respective injection signals to produce complementary sideband signals on a common carrier frequency different from the carrier frequency of the vestigial sideband signal, summing the two complementary sideband signals to produce a double sideband signal, and demodulating the double sideband signal.

6. The method defined in claim 5 and wherein the vestigial sideband signal is mixed with the injection signal of larger frequency and the difference frequency components are selected to produce a sideband signal representing the suppressed sideband, and the vestigial sideband signal is mixed with the injection signal of smaller frequency and the sum frequency components are selected to produce a sideband signal representing the unsuppressed sideband.

7. The method of correcting for phase and quadrature distortion in the reception and demodulation of vestigial sideband transmission, comprising the steps of deriving from the vestigial sideband transmission a reference signal representing the carrier frequency thereof, generating a local signal having a frequency harmonically unrelated to said carrier frequency, developing from the reference signal and the local signal one injection signal having a frequency equal to a multiple of the local signal and another injection signal having a frequency equal to the difference between twice the carrier frequency and the frequency of said one injection signal, mixing each of the injection signals with the vestigial sideband signal to produce respective complementary sideband signals on a common carrier frequency harmonically unrelated to each of the previously said frequencies, summing the two complementary sideband signals to produce a double sideband signal, and demodulating the double sideband signal.

8. The method defined in claim 7, and wherein said reference signal is derived by mixing a signal having a frequency equal to a multiple of the local signal frequency with the vestigial sideband signal to produce a beat frequency less than about 500 kilocycles per second, filtering the resulting signal to remove therefrom sidebands corresponding to the line repetition and higher frequencies, and limiting the filtered signal to remove amplitude modulation therefrom.

9. The method defined by claim 8 and including also regulating the value of the locally generated frequency to maintain said beat frequency at a uniform predetermined value.

10. The method defined by claim 8 and including also introducing a phase difference between said two injection signals, the value of said phase difference being adjusted to make the phase vs. frequency characteristic of said double sideband signal substantially linear.

11. The method of demodulating a vestigial sideband signal, comprising in combination producing first and second injection signals having frequencies such that one injection signal frequency is equal to the difference between the other injection signal frequency and twice the carrier frequency of the vestigial sideband signal, mixing the vestigial sideband signal with the respective injection signals to produce complementary sideband signals on a common carrier frequency different from the carrier frequency of the vestigial sideband signal, summing the two complementary sideband signals to produce a double sideband signal, introducing a variable phase difference between said two injection signals and adjusting said phase difference to produce a difference of phase between said complementary sideband signals of such value that that phase vs. frequency characteristic of said double sideband signal is substantially linear, and demodulating the double sideband signal.

12. A system for demodulating a vestigial sideband signal with substantial elimination of phase and quadrature distortion, comprising in combination means for developing a reference signal of frequency $f$ representing the carrier frequency of the vestigial sideband signal, frequency dividing circuit means responsive to said reference signal for producing a signal of frequency $f/p$, frequency multiplying circuit means responsive to the last said signal for producing two separate injection signals having respective frequencies $mf/p$ and $nf/p$, where $m$, $n$ and $p$ are integers such that $n$ equals the difference between $m$ and $2p$, means for mixing the vestigial sideband signal with the respective injection signals and selecting summation components to produce two mutually complementary sideband signals on a common carrier frequency, means for summing the complementary sideband signals to produce a double sideband signal, and means for demodulating the double sideband signal.

13. A system as defined in claim 12, and including also means operable to introduce a variable degree of phase difference between said two injection signals.

14. A system as defined in claim 12, and wherein said frequency dividing circuit means comprise first amplifying means having an input responsive to said reference signal and having an output circuit tuned to the frequency $f/p$, second amplifying means having an input responsive to the output circuit of the first amplifying means and having an output circuit tuned to the frequency $(p-1)f/p$, and feedback circuit means between the output of the second amplifying means and the input of the first amplifying means and adapted to produce a beat frequency $f/p$ between said input frequency $f$ and said tuned frequency of the second amplifying means output circuit, said beat frequency tending to lock the output circuit of the first amplifying means to the frequency $f/p$.

15. A system as defined in claim 14, and wherein said second amplifying means and the output circuit thereof comprise a portion of said frequency multiplying circuit means.

16. A system as defined in claim 12, and wherein said frequency dividing circuit means comprise first amplifying means having an input responsive to said reference signal and an output circuit tuned to the frequency $f/p$, and said frequency multiplying circuit means comprise second amplifying means having an input responsive to the output of the first amplifying means and having an output circuit tuned to the frequency $(p-1)f/p$, said frequency dividing circuit means including also feedback circuit means between the output of the second amplifying means and the input of the first amplifying means and adapted to produce a beat frequency $f/p$ between said input frequency $f$ and said tuned frequency of the second amplifying means output circuit, said beat frequency tending to lock the output circuit of the first amplifying means to the frequency $f/p$.

17. Apparatus for correcting phase and quadrature distortion in the reception and demodulation of vestigial sideband transmission, comprising the combination of means for receiving the vestigial sideband signal and for producing therefrom a non-suppressed sideband I.F. video signal S on a carrier frequency $f_1$, a first source of injection signal of frequency $f_x$, a first mixer receiving the signal S and the signal of frequency $f_x$ and producing a difference component representing a recreated suppressed sideband video signal, a second source of injection signal of frequency $f_y$, the frequencies of said first and second sources being so selected as to satisfy the equation $f_x-f_1=f_y+f_1$, a second mixer receiving the signal S and the signal of frequency $f_y$ and producing a sum component representing the non-suppressed sideband video signal, combining means receiving the outputs and the respective first and second mixers, and means for demodulating the output from the combining means.

18. Apparatus for correcting phase and quadrature distortion in the demodulation of a vestigial sideband signal, comprising the combination of means for deriving from the vestigial sideband signal a reference signal representing the carrier frequency thereof, means for generating a local signal having a frequency harmonically unrelated to said carrier frequency, means responsive to the local signal for developing a first injection signal having a frequency harmonically unrelated to the carrier frequency, means responsive to the local signal and to said reference signal for developing a second injection signal having a frequency equal to the difference between the first injection frequency and twice the carrier frequency of the vestigial sideband signal, means for mixing the vestigial sideband signal in opposite phase with the respective injection signals to produce complementary sideband signals on a common carrier frequency, means for adding the complementary sideband signals to produce a double sideband signal, and means for demodulating the double sideband signal.

19. Apparatus as defined in claim 18, and including also means operable to adjust the relative phase of the injection signals to produce a variable phase difference between the complementary sideband signals.

20. A system for demodulating a vestigial sideband television signal with substantial elimination of phase and quadrature distortion, comprising in combination means for generating a local signal having a frequency harmonically unrelated to the carrier frequency of the vestigial sideband signal, means for mixing a signal derived from the local signal with the vestigial sideband signal to produce a beat frequency less than about 500 kilocycles per second and greater than the line repetition frequency, means for filtering said beat frequency to remove therefrom sidebands corresponding to the line repetition and higher frequencies, means for limiting the filtered beat frequency to remove amplitude modulation therefrom and thereby to produce a reference signal representative of the phase of the carrier frequency, means responsive to the reference signal and the local signal for deriving from the vestigial sideband signal two complementary sideband signals on a common carrier frequency, means for summing the complementary sideband signals to produce a double sideband signal, and means for demodulating the double sideband signal.

21. A system for demodulating an intermediate frequency vestigial sideband video signal with substantial elimination of phase and quadrature distortion, comprising in combination means for generating a local signal having a frequency that is variable in response to a control signal, means for mixing the vestigial sideband signal with a signal derived from the local signal to produce a beat signal, means for filtering the beat signal to remove therefrom sidebands corresponding to the line repetition and higher frequencies, means for limiting the filtered beat signal to remove amplitude modulation therefrom and thereby to produce a wave form representative of the carrier frequency of the video signal, means responsive to the frequency of said waveform for supplying to said signal generating means a control signal to maintain the waveform frequency uniform at a predetermined value, means responsive to the local signal and said waveform for deriving two injection signals having frequencies $f_x$ and $f_y$ such that $f_y$ equals the difference between $f_x$ and twice the carrier frequency of the video signal, means for mixing the video signal with the respective injection signals and selecting summation components to produce complementary sideband signals on a common carrier frequency, means for adding the complementary sideband signals to produce a double sideband signal, and means for demodulating the double sideband signal.

22. A system as defined in claim 21, and wherein said predetermined value of the waveform frequency exceeds the line repetition frequency, is less than the carrier frequency of the vestigial sideband signal by a factor of at least about 100, and corresponds to the center frequency of said filtering means.

23. A system as defined in claim 21, and wherein said means for deriving the injection signals comprise means for deriving a signal having a frequency equal to a multiple of the local signal frequency to produce the injection signal of frequency $f_x$, and means for deriving a signal that is a linear combination of said waveform and said local signal to produce the injection signal of frequency $f_y$.

24. A system as defined in claim 21, and including also means operable to introduce a variable degree of phase difference between said two injection signals ahead of said combining means.

25. A system for demodulating a vestigial sideband radio frequency television signal, comprising in combination means for receiving the radio frequency signal and converting the same to an intermediate frequency signal that includes the transmitted sideband and an appreciable portion of the suppressed sideband, first intermediate frequency amplifying means having a pass band adapted to transmit substantially the whole of the intermediate frequency signal, circuit means responsive to the output of said first amplifying means for deriving therefrom a waveform representing the carrier frequency thereof, second intermediate frequency amplifying means for amplifying and shaping the output of the first amplifying means to produce an intermediate frequency video signal of spectral distribution that is complementary with respect to the carrier frequency, circuit means responsive to the last said signal and to said waveform for producing two complementary sideband signals on a common carrier frequency, means for combining the complementary sideband signals to produce a double sideband signal, and means for demodulating the double sideband signal.

26. A system as defined in claim 25, and wherein said circuit means for producing complementary sideband signals comprise circuit means responsive to said waveform for deriving two injection signals having frequencies such that one injection frequency equals the difference between the other injection frequency and twice said carrier frequency, and means for mixing the amplified and shaped intermediate frequency video signal with the respective injection signals to produce said complementary sideband signals.

References Cited

UNITED STATES PATENTS

| | | | |
|---|---|---|---|
| 3,294,897 | 12/1966 | Davidse | 178—5.4 |
| 2,987,617 | 6/1961 | Loughlin | 325—331 |

KATHLEEN H. CLAFFY, Primary Examiner

C. JIRAUCH, Assistant Examiner

U.S. Cl. X.R.

325—430